(12) United States Patent
Weiss

(10) Patent No.: US 9,592,961 B2
(45) Date of Patent: Mar. 14, 2017

(54) ROBOT-ENABLED CASE PICKING

(71) Applicant: Seegrid Corporation, Pittsburgh, PA (US)

(72) Inventor: Mitchell Weiss, Carlisle, MA (US)

(73) Assignee: Seegrid Corporation, Pittsburgh, PA (US)

( * ) Notice: Subject to any disclaimer, the term of this patent is extended or adjusted under 35 U.S.C. 154(b) by 0 days.

(21) Appl. No.: 14/543,241

(22) Filed: Nov. 17, 2014

(65) Prior Publication Data

US 2015/0073586 A1  Mar. 12, 2015

Related U.S. Application Data

(63) Continuation of application No. 13/530,876, filed on Jun. 22, 2012, now Pat. No. 8,892,241.

(60) Provisional application No. 61/501,026, filed on Jun. 24, 2011.

(51) Int. Cl.
| | | |
|---|---|---|
| *G06F 7/00* | (2006.01) | |
| *B65G 1/137* | (2006.01) | |
| *B66F 9/06* | (2006.01) | |
| *G05B 19/418* | (2006.01) | |

(52) U.S. Cl.
CPC ............ *B65G 1/1378* (2013.01); *B66F 9/063* (2013.01); *G05B 19/41895* (2013.01); *G05B 2219/31007* (2013.01); *G05B 2219/40298* (2013.01); *Y02P 90/285* (2015.11); *Y10S 901/01* (2013.01)

(58) Field of Classification Search
None
See application file for complete search history.

(56) References Cited

U.S. PATENT DOCUMENTS

| 7,101,139 B1 | 9/2006 | Benedict |
|---|---|---|
| 2004/0083025 A1 | 4/2004 | Yamanouchi et al. |
| 2006/0047361 A1 | 3/2006 | Sato et al. |
| 2007/0233362 A1 | 10/2007 | Carriker et al. |
| 2008/0131255 A1 | 6/2008 | Hessler et al. |
| 2009/0119010 A1* | 5/2009 | Moravec .............. G05D 1/0251 701/533 |
| 2010/0049398 A1 | 2/2010 | Bryant et al. |

(Continued)

OTHER PUBLICATIONS

International Search Report and Written Opinion dated Oct. 9, 2012, issued in corresponding International Application No. PCT/US2012/043801.

*Primary Examiner* — Yolanda Cumbess
(74) *Attorney, Agent, or Firm* — Onello & Mello, LLP.

(57) ABSTRACT

A robot-enabled method of picking cases in a warehouse is provided. A robotic vehicle includes a processor configured to access a memory, a user input device, an output device, and a load platform, and has access to an electronically stored representation of a warehouse. The representation includes a map that defines aisles for storing items arranged as pick faces within the warehouse. A pick list is generated from an order; the pick list provides identifications of items to be picked to fulfill the order. Determined from the pick list is a plurality of stops at pick faces associated with the items. A route within the map is generated that includes the plurality of stops. The robotic vehicle iteratively guides itself along the route and automatically stops at each of the plurality of stops to enable loading of the items from the pick list onto the load platform.

20 Claims, 7 Drawing Sheets

(56) References Cited

U.S. PATENT DOCUMENTS

2010/0296908 A1* 11/2010 Ko .................. B66F 9/0755
  414/800
2011/0200420 A1* 8/2011 Driskill .............. G06Q 10/087
  414/807

* cited by examiner

ROBOT-ENABLED CASE PICKING

CROSS REFERENCE TO RELATED APPLICATIONS

This application is a continuation application of U.S. Pat. No. 8,892,241, entitled Robot-Enabled Case Picking, issued Nov. 18, 2014, which claimed the benefit of priority under 35 U.S.C. §119(e) from provisional application Ser. No. 61/501,026, entitled Robot-Enabled Case Picking, filed on Jun. 24, 2011, which is incorporated herein by reference in its entirety.

FIELD OF INTEREST

The present inventive concepts relate to the field of systems and methods in the field of storage facility management, and more particularly to systems and methods involved in case picking or selection.

BACKGROUND

A storage facility is a facility primarily used for storage of goods for commercial purposes, such as a warehouse. The storage is generally intended to be temporary, as such goods ultimately may be intended for a retailer, consumer or customer, distributor, transporter or other subsequent receiver. A warehouse can be a standalone facility, or can be part of a multi-use facility. Thousands of types of items can be stored in a typical warehouse. The items can be small or large, individual or bulk. It is common to load items on a pallet for transportation, and the warehouse may use pallets as a manner of internally transporting and storing items.

A well-run warehouse is well-organized and maintains an accurate inventory of goods. Goods can come and go frequently, throughout the day, in a warehouse. In fact, some large and very busy warehouses work three shifts, continually moving goods throughout the warehouse as they are received or needed to fulfill orders. Shipping and receiving areas, which may be the same area, are the location(s) in the warehouse where large trucks pick-up and drop-off goods. The warehouse can also include a staging area—as an intermediate area between shipping and receiving and storage aisles within the warehouse where the goods are stored. The staging area, for example, can be used for confirming that all items on the shipping manifest were received in acceptable condition. The staging area can also be used to build orders and pallets to fulfill orders that are to be shipped.

Goods in a warehouse tend to be moved in one of two ways, either by pallet or by cart (or trailer). A pallet requires a pallet transport for movement, such as a pallet jack, pallet truck, forklift, or stacker. A stacker is a piece of equipment that is similar to a fork lift, but can raise the pallet to significantly greater heights, e.g., for loading a pallet on a warehouse shelf. A cart requires a tugger (or "tow tractor"), which enables a user to pull the cart from place to place.

A pallet transport can be manual or motorized. A traditional pallet jack is a manually operated piece of equipment, as is a traditional stacker. When a pallet transport is motorized, it can take the form of a powered pallet jack, pallet truck, or forklift (or lift truck). A motorized stacker is referred to as a power stacker. A motorized pallet jack is referred to as a powered pallet jack, which an operator cannot ride, but walks beside. A pallet truck is similar to a powered pallet jack, but includes a place for an operator to stand.

As with motorized pallet transports, a tugger can be in the form of a drivable vehicle or in the form of a powered vehicle along the side of which the operator walks. In either form, a tugger includes a hitch that engages with a companion part on the cart, such as a sturdy and rigid ring or loop.

Automatic guided vehicle (AGV) forms of pallet trucks and powered tuggers exist. An AGV is a mobile robot that follows markers or wires in the floor, or uses vision or lasers to make its way without direct or remote control by an operator. They are most often used in industrial applications to move materials around a manufacturing facility or a warehouse, such as in the case of AGV forklifts and AGV tuggers.

FIG. 1 is a simplified diagram of a storage facility 100 in the form of a warehouse. Warehouses can range in size, e.g., a large warehouse can be 100,000 square feet or more. Warehouse 100 includes a shipping & receiving area 110 and a staging area 112. A loading dock may be provided, where goods can be loaded on and unloaded from trucks 116. In the staging area, pallets 114 are shown, and may be loaded with warehouse goods to fulfill an order. When a pallet 114 is loaded with goods, it can remain in the staging area 112 until it is ready for loading on a truck 116. In which case, the pallet 114 is moved to the shipping & receiving area 110 and then onto the truck 116.

Warehouse 100 includes a plurality of aisles and storage spaces (collectively aisles 120) where the goods are intended to be stored in an orderly manner. Additionally, zones can be defined in a warehouse—as a means for categorizing areas within a warehouse. A zone can be defined for an aisle, group of aisles, portion of an aisle, or various combinations thereof. In FIG. 1, several zones are defined, including zones A-E.

When one or more orders is to be filled, a "pick list" is generated, which tells an order selector (or picker) which aisles to go to and which goods to pick. Pallet transports or tuggers and carts (collectively pallet transport 130) are sent through warehouse 100 with the order selector to "pick" cases, totes, cartons, or other forms of containers of goods (collectively "cases" herein). A "tote" is a container that is used to fill an order on a piece-by-piece basis, where the pieces are individual goods or groupings of relatively small goods. The goods are arranged in aisles 120, and the same goods are arranged as a "pick face." A "pick face" is a location, usually a two-dimensional facing or area, in a warehouse or stock area that is designated for the storage of one or more products and is accessible by an order selector for order filling. The cases are loaded on pallet transport 130 and brought to either the staging area 112 or shipping & receiving area 110.

FIG. 2 is a block diagram of a front view of an aisle and pick faces that can exist in aisle 120. In this view, four pick faces are shown, i.e., pick faces 0, 1, 5, and 6. Pick faces 0 and 1 are located on a shelf and pick faces 5 and 6 are at ground level. Each pick face is defined for a certain product. For example, pick face 0 shows 6 cases of the same product in FIG. 2.

There are different approaches to arranging products in a warehouse, which is referred to as "slotting." Slotting is viewed by many to be the key to the efficiency of the warehouse operation, where the highest possible "pick rates" are desired. Generally speaking, "pick rate" means the number of cases or units picked per unit of time, e.g., cases per hour.

One common approach to slotting products is to use item velocity. Generally, the more popular a product is, the higher its item velocity—the faster or more frequently it moves in and out of the warehouse. When slotting by item velocity, it is typical to keep the products with the highest item velocities in zones closest to the shipping & receiving 110 area (or staging area 112). Meanwhile, items with the lowest item velocities tend to be in zones furthest away. Slotting by item velocity can reduce travel time within a warehouse when filling orders. Reducing travel time is an important factor in increasing pick rates—so it is considered quite advantageous to slot by item velocity.

Another way to slot products in a warehouse is by product categories—grocery stores tend to use this approach. For example, paper products may be a product category. One or more product categories may exist within a zone. To increase efficiency with this type of product slotting, it may be advantageous to pick all products from a category that are needed to fill multiple orders—and then put the orders together in the staging area 112.

There are many different methods for filling the order. The method chosen will typically depend on the way the products are slotted and whether or not cases are being picked versus individual products, e.g., a case of aspirin versus 12 bottles of aspirin. Some of the most common order picking methods are:

Single order picking—Each order selector selects a customer order and picks it to completion.

Batch picking—An order selector fills several orders at a time in order to reduce the amount of time spent traveling.

Pick and pass—Each order selector concentrates on his own area or zone and orders pass (mechanically or manually) from one order selector to the next.

Zone picking with aggregation on the shipping dock—Different zones send one or more cases to shipping for each order, and the cases from each zone are palletized together on the shipping dock.

Zone picking with aggregation at packing—Each zone sends one or more totes to a packing area (e.g., staging 112 in FIG. 1) with its portion of the order. At packing, all totes for an order are consolidated, and outbound cartons (e.g., boxes) are packed with the goods from the totes for a particular order.

Zone picking without aggregation—Each zone fills its carton for the order, and these are sent directly to the shipping trailer.

Unit sortation—Order selectors pull batches of product from their zones that are then sorted to the order by a tilt tray or cross-belt sorter.

The appropriateness of a particular order filling method will also depend on its impact on pick rates. The higher the overall pick rate, the more efficient and cost effective the warehouse.

Referring again to FIG. 1, a warehouse management system, or WMS, 140 is a key part of the supply chain and primarily aims to control the movement and storage of goods within warehouse 100. The WMS can process transactions associated with the movement of goods into, out of, and within the warehouse, including shipping, receiving, putaway and picking. "Putaway" generally refers to moving goods into the warehouse or storage area at their designated storage locations, e.g., zones and pick faces.

The WMS can provide a set of computerized procedures to handle the tracking and management of goods at a warehouse, model and manage the logical representation of the physical storage facilities (e.g. racking etc.), and enable a seamless link to order processing and logistics management in order to pick, pack and ship product out of the warehouse. Warehouse management systems can be stand-alone systems, or modules of an enterprise resource management system or supply chain execution suite. Orders can be electronically received by a WMS or manually input. Pick lists can be automatically or manually generated from the order, which can include route optimization performed by the WMS.

When picking cases to fill orders, it is typical to use pallet transports 130 that are navigated through the warehouse 100 to pick faces within zones to retrieve the necessary product cases. When doing so, the pallet transport 130 is navigated under the control of the order selector. That is, the order selector looks at a first/next item on a pick list, which indicates the aisle, pick face, and (optionally) zone where the corresponding product is located. The order selector drives the pallet transport to the pick face, and loads the appropriate number of cases on the pallet (or cart). This is done for each product on the pick list, until the order selector has worked completely through the pick list.

If the order selector is only picking for a particular zone, he can bring the pallet transport to the next zone and hand it off to the next order selector to continue working down the pick list. If the order selector is picking the complete pick list, then he can drive the pallet transport to the shipping & receiving area 110 or staging area 112 when the order is complete.

SUMMARY OF INVENTION

In accordance with aspects of the present invention, provided is a robot-enabled method of picking cases in a storage facility. The method includes providing a robotic vehicle having a processor configured to access a memory and a load platform. The robotic vehicle has access to an electronically stored representation of the storage facility; the representation includes locations within the storage facility for storing items arranged as pick faces. A pick list is generated from an order, the pick list providing identifications of items to be picked to fulfill the order. From the pick list a plurality of pick faces associated with the items is determined. A route within the map is electronically generated that includes the plurality of pick faces. The robotic vehicle iteratively navigates itself along the route and automatically stops or slows down at each of the plurality of pick faces to enable loading of the items from the pick list onto the load platform.

The representation of the storage facility can be a two-dimensional map.

The method can further include manually entering the order to the robotic vehicle through a user input device.

The method can further include electronically communicating the order to the robotic vehicle. In such a case, the order can be electronically communicated to the robotic vehicle by a storage facility management system.

The method can further include manually entering the pick list to the robotic vehicle through a user input device.

The method can further include electronically communicating the pick list to the robotic vehicle. In such a case, the pick list can be electronically communicated to the robotic vehicle by a storage facility management system.

The method can further include automatically generating the pick list from an electronically stored order.

The method can further include manually entering the route to the robotic vehicle through a user input device.

The method can further include electronically communicating the route to the robotic vehicle. In such a case, the route can be electronically communicated to the robotic vehicle by a storage facility management system.

The method can further include automatically generating the route from an electronically stored pick list.

The method can further include tracking the robotic vehicle using a wireless network. In such a case, the wireless network can include wireless access points distributed throughout the storage facility. And the method can further include determining a location of the robotic vehicle from a strength of one or more wireless signals transmitted by the robotic vehicle and received by one or more of the access points.

The method can further include the robotic vehicle initiating travel to a next pick face, of the plurality of pick faces, in response to a user input. In such a case, the user input can be a voice command. In other cases, the user input can be a gesture.

In other cases, the user input can be an actuation of a physical mechanism that provides an electronic signal to the robotic vehicle. The physical mechanism can be one or more of a button, RF gun, or touch screen.

The method can further include providing an output device, and the robot vehicle can communicate with a user via the output device.

The method can further include, at each pick face, the robotic vehicle outputting a message that identifies a set of items to be picked from the pick face to fill the order.

In such a case, the message can further identify a quantity of each item in the set of items to be picked from the pick face to fill the order.

The message can further identify a specific position on the load platform to place a picked item.

The message can include an audio voice message.

The message can include a text output.

Outputting the message can include outputting a pattern of one or more lights or symbols.

The output device can be a wireless Bluetooth device. The wireless Bluetooth device can communicate with a wireless headset or handset.

The output device can include a display.

The output device can include one or more lights.

Pick faces can be associated with predetermined zones, and the route can be determined on a zone-by-zone basis.

The robotic vehicle can be one of a plurality of robotic vehicles, and the method can include electronically optimizing routes of the plurality of vehicles to avoid congestion within the storage facility.

The method can further include electronically optimizing the route of the robotic vehicle to minimize robotic vehicle travel distance within the storage facility.

The method can further include electronically optimizing the route of the robotic vehicle to minimize order distance within the storage facility.

The method can further include electronically optimizing the route of the robotic vehicle to maximize pick rate.

The method can further include the robotic vehicle iteratively navigating itself along the route using an evidence grid populated with data indicating probabilities of locations of objects in the storage facility. The evidence grid can be a three-dimensional (3-D) evidence grid.

The method can further include the robotic vehicle collecting sensor data used to update the evidence grid while the robotic vehicle iteratively navigates itself along the route.

The representation of the storage facility can include a list of route segments.

The robotic vehicle can be a forklift.

The robotic vehicle can be a high lift.

The storage facility can be a warehouse.

The robotic vehicle can be a pallet truck and the load platform can be a pallet.

The robotic vehicle can be a tugger and the load platform can be a cart.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings.

DETAILED DESCRIPTION OF PREFERRED EMBODIMENT

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Figure 1:
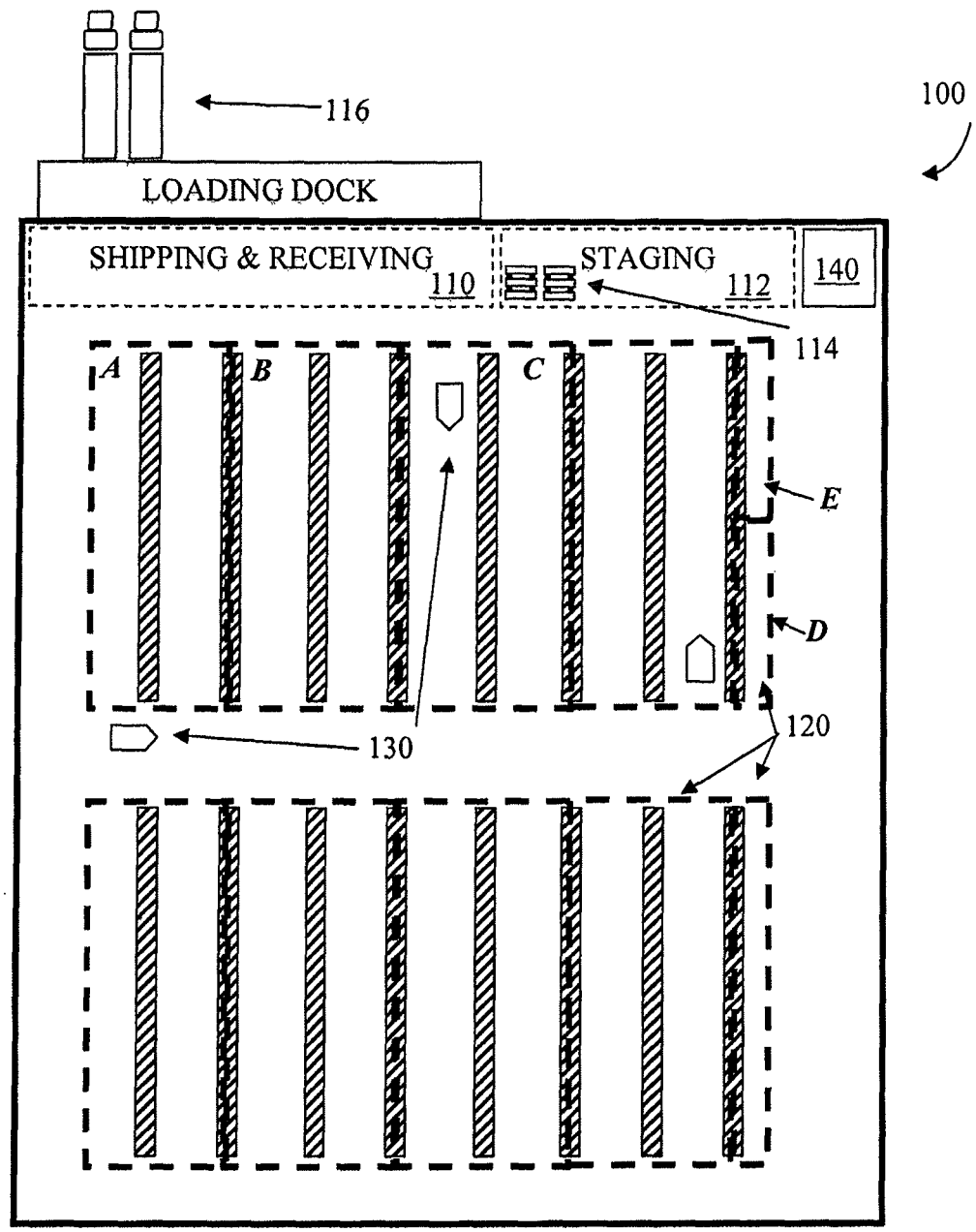
FIG. 1 is a block diagram of a simplified warehouse.
Figure 2:
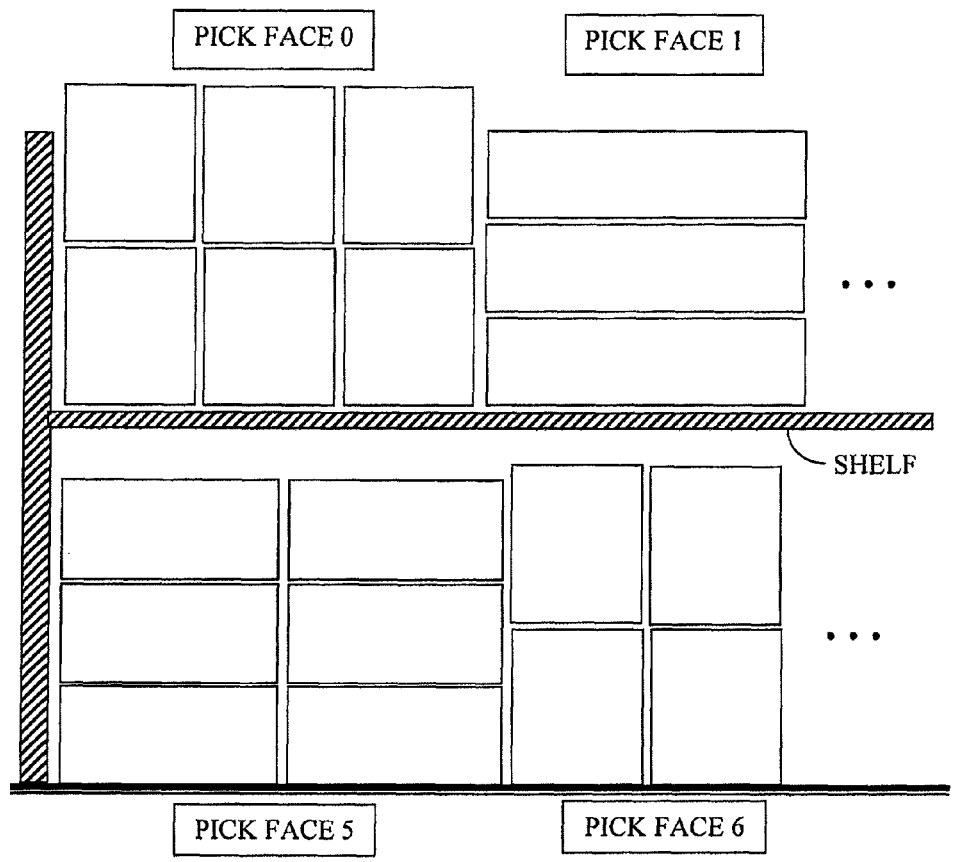
FIG. 2 is a block diagram of a front view of an aisle and pick faces.
Figure 3:
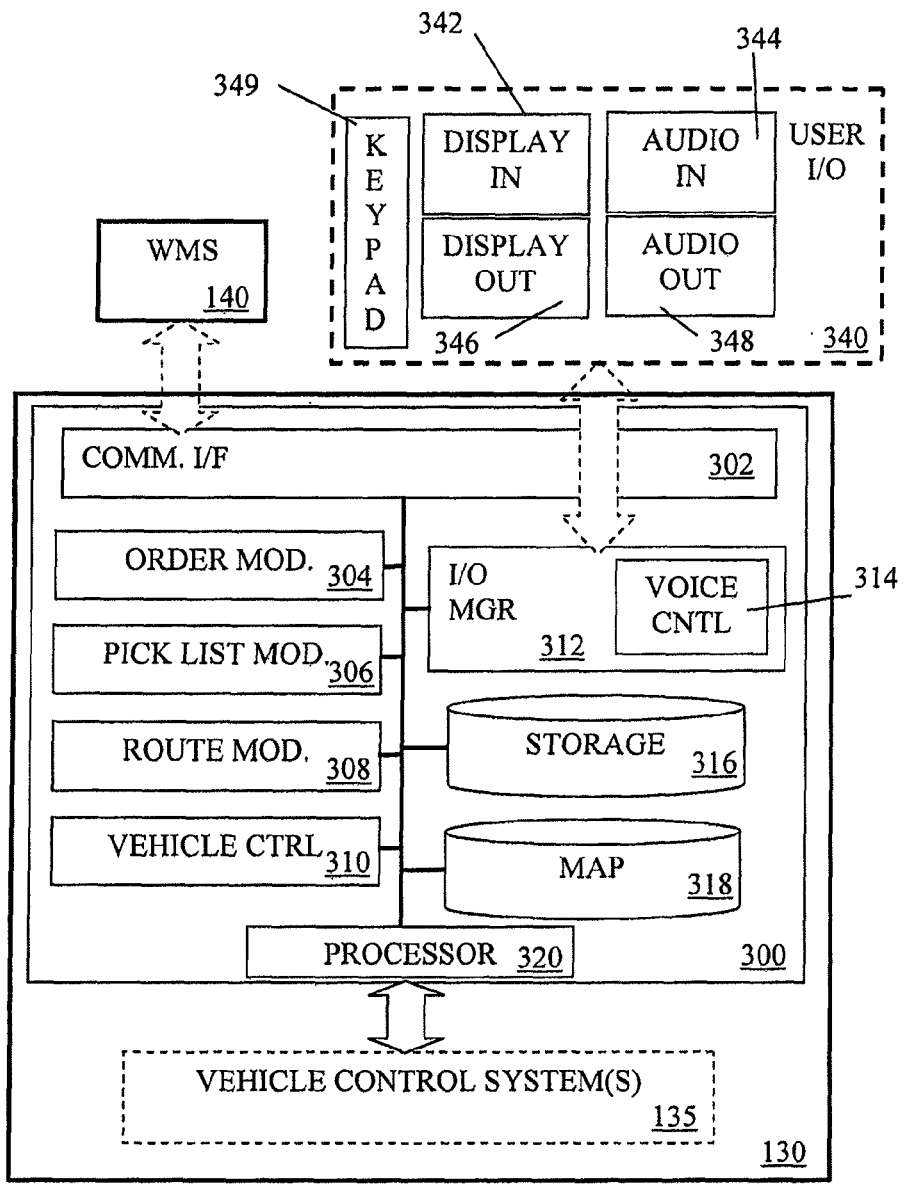
FIG. 3 is a block diagram of an embodiment of a robotic vehicle modules that enable case picking, in accordance with aspects of the present invention.

FIG. 3 is a block diagram of an embodiment of a robotic vehicle 330 and various robotic vehicle modules 300 that can be used to enable case picking, in accordance with aspects of the present invention. Those skilled in the art will appreciate that in this embodiment, the functions of modules 300 could be provided in modules other than those shown in FIG. 3. As an example, modules 300 can take the form of computer program code stored in a non-transitory storage media 316 and executed by at least one processor 320.

FIG. 3 also shows a user device 340 that serves as a device that enables a user (e.g., order selector) to interact with the robotic vehicle, e.g., to provide inputs. The user device 340 can be part of, or onboard, robotic vehicle 330 or it can be a separate device, or some combination thereof. For example, user device 340 could be part of a control system on robotic vehicle 330 or it could be a handheld wireless device. In other embodiments, the user device could be a device stationed in a zone or aisle or at a pick face. In other embodiments, the user device could be distributed across two or more of the robotic vehicle, a handheld device, a stationary device in a zone or aisle or at a pick face, and a storage facility management system.

A communication module 302 enables communication between robotic vehicle 330 and external systems, such as a storage facility management system 140' (e.g., a warehouse management system WMS 140'), and user device 340. The communication between these different systems, subsystems, and/or entities will be as described herein, but could be different in other embodiments. Communication module 302 can enable one or more known or hereafter developed types of communication, whether wired or wireless, and implement the necessary protocols and message formats associated therewith. Such types of communication can include, but are not limited to, Ethernet, Bluetooth, wireless modem/router, high speed wire, radio frequency, and so on.

An order module 304 can be used to receive and order from WMS 140' or user device 340, in this embodiment. That is, WMS 140' can receive an order from an external source, e.g., over the Internet, intranet, extranet, virtual private network (VPN), and so on, and communicate the order to robotic vehicle modules 300 via communication module 302. Otherwise, order module 304 could receive an order from a non-transitory memory, such as a Flash drive, CD ROM, or similar storage device.

In some embodiments, user device 340 could be used to transmit an order to robotic vehicle modules 300, via communication module 302. In FIG. 3, various input and output mechanisms are shown for a user device 340. These include a keypad or keyboard 349, input display (e.g., touch screen) 342, and a voice input (e.g., microphone) 344, in this embodiment. User device 340 could be a cell phone, personal digital assistance, or similar network enabled, handheld device, as examples. The display can be any wireless type display, e.g., radio frequency (RF) display.

When an order is received, or otherwise electronically stored at the robotic vehicle 300, a pick list module 306 can process the order to generate a pick list. A pick list, therefore, is a list of items to be picked in the warehouse to fill at least one order. In addition to the order, the pick list module 306 can generate the pick list using various types of information, such as product inventory. The pick list could also be generated using information relating to pick zones associated with products, and pick faces within pick zones where the products physically reside. Alternatively, a user may specify a pick list manually, e.g., via an interface on or off the robotic vehicle, such as the user interactive screens shown in FIGS. 4A-4B. This information can be stored in storage device 316, or made available from WMS 140'.

With a pick list generated, a route module 308 can be used to generate a route through the warehouse to be followed by robotic vehicle 330, as the robotic vehicle works its way through the warehouse to gather the products. In addition to the pick list, route module 308 can generate the route using various types of information, such as an electronic map representing the warehouse, including pick zones and pick faces within pick zones. As will be appreciated by those skilled in the art, the route module may include functionality to optimize the route based on minimizing distance travelled, minimizing congestion (in view of routes of other robotic vehicles), minimizing time, and/or order stacking considerations (e.g., heaviest items on bottom), as examples. The route can be stored in storage device 316, or made available from WMS 140'.

While order module 304, pick list module 306, and route module 308 are shown as part of robotic vehicle 330, in other embodiments one or more of the foregoing could reside at the WMS 140', or at one or more other systems that communicate with WMS 140' and/or robotic vehicle 330. In some embodiments, one or more of these modules may reside at user device 340.

Vehicle control system 135 is that system that generally causes robotic vehicle 330 to travel through the facility. It can receive instructions, and automatically route itself to a destination within a facility, e.g. a warehouse. Robotic vehicles can use electronic maps, markers, vision systems, and so on for guidance. However, typical robotic vehicles have no ability to iterate themselves through an environment (e.g., a facility).

Vehicle control module 310 communicates with vehicle control system 135 to achieve an iterative robotic navigation through an environment, in this case warehouse 100. Vehicle control system 310 can use the route created by route module 308, which includes the pick zone and pick face information necessary to fill the initial order. As will be described in greater detail, vehicle control module 310 can cause vehicle control system 135 to robotically navigate to a pick face within a pick zone.

An input/output (I/O) manager 312 communicates the picking information to an order selector, e.g., that either rides or walks beside the robotic vehicle, or may be stationed at a zone or pick face. Display in module 342 and display out module 346 could be the same device, such as a touch screen. The output at the user device 340 could take the form of screens, and/or audio output via audio out module 348. The output could also include the output of light patterns, symbols, or other graphical or visual effects.

Once the items are picked, the user, by operating a user device, such as user device 340, can indicate such to the robotic vehicle 130, via I/O manager 312. For example, a user could simply say "Go" or "Next," via audio in module 344, and vehicle control module 310 could cause the vehicle control system to navigate to the next stop in the route. Additionally, or alternatively, the user may be allowed to use a keypad 349 or touch screen (display in module 342) entry to accomplish the same action.

Figure 4A:
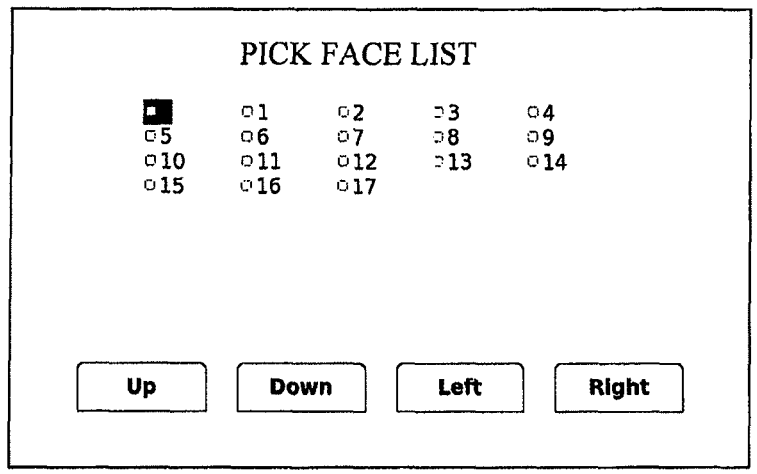
FIGS. 4A and 4B are front views of an embodiment of pick face list displays, in accordance with aspects of the present invention.
Figure 4B:
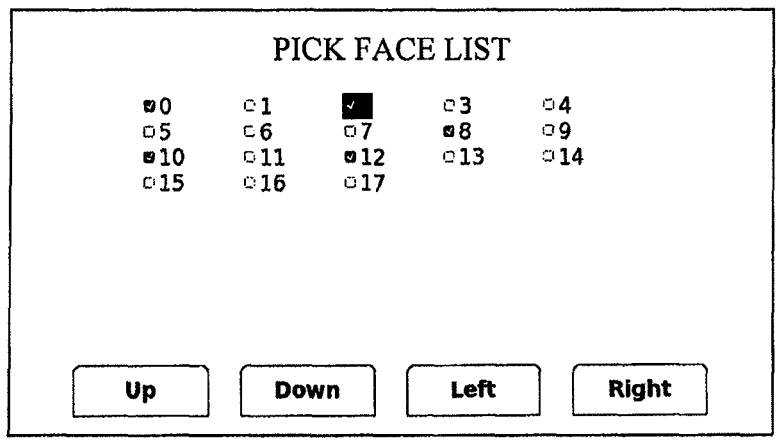

In the embodiments of FIGS. 4A and 4B, an approach to manually creating a pick list by hand is shown. Here, Up, Down, Left, and Right keys are provided to enable a user to choose specific pick faces to be included in a pick list, which can be displayed via display out module 346. Each pick face number represents a different pick face—where selection of a pick face adds the pick face to the pick list.

Pick lists can be created in others ways in other embodiments. For example, an order could be entered and a pick list could be automatically generated. The present invention is not limited to the manual approach of FIGS. 4A and 4B, nor is it limited to those screens or functionality.

Figure 5:
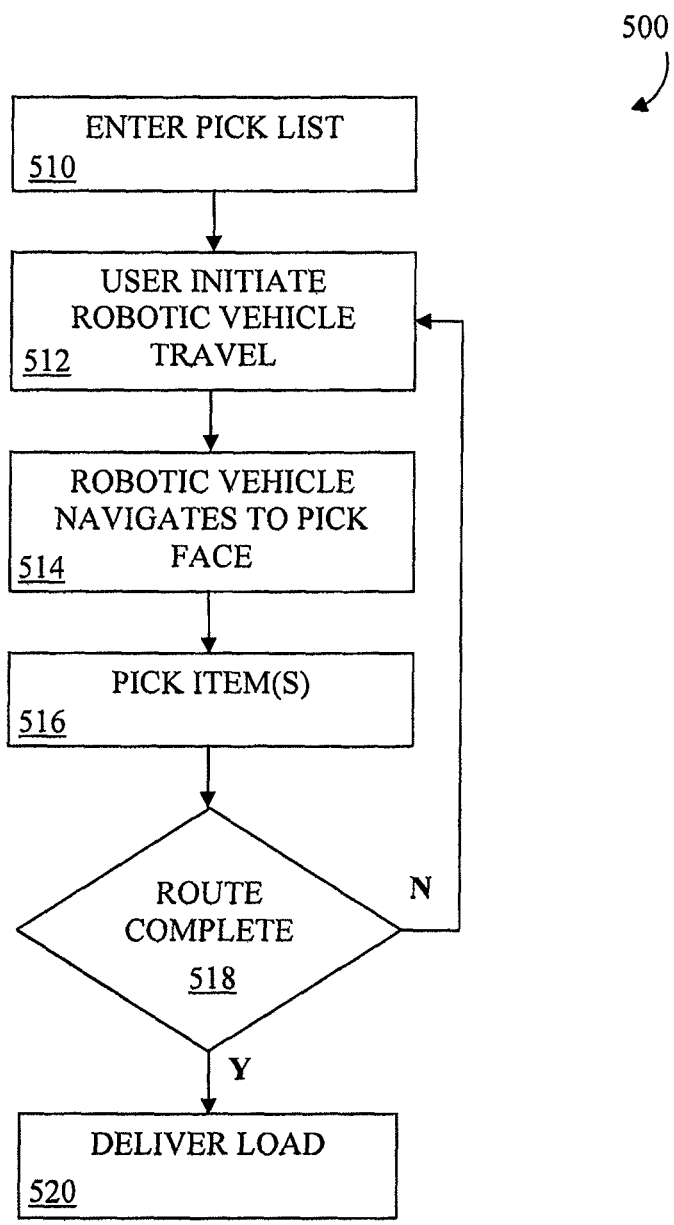
FIG. 5 is a flowchart depicting an embodiment of a method of picking cases with robotic vehicle assistance, in accordance with aspects of the present invention.

FIG. 5 is a flowchart depicting an embodiment of a method 500 of picking cases with robotic vehicle assistance, in accordance with aspects of the present invention. This method can be carried out by the robotic vehicle modules 300 of FIG. 3, or similar systems. Method 500 can take at least the following two forms:

Follow-Model with Button—Demonstrates the ability for a worker (i.e., user or order selector) to team with a robotic vehicle to travel a warehouse and pick an order without getting on or off a pallet jack. The order selector can direct or control the flow of the robotic vehicle.

Follow-Model with Voice Option—Complete hands-free operation of a robotic vehicle to partner with an order selector to pick cases can be provided. Here the order selector can be freed from hands-on interaction with the robotic vehicle. The order selector uses a voice system to command the robot start/stop/slow down. The order selector directs or controls the flow of the robotic vehicle and the voice system tells the order selector what to do. In other embodiments, the order selector could interact with the robotic vehicle using gestures, e.g. hand signals.

As shown in FIG. 5, a pick list can be entered into the robotic vehicle in step 510, and the order selector can initiate robotic vehicle travel to a first pick face in step 512. Robotic travel can be initiated by voice, gesture, button or other user interactive mechanism. In step 514, the robotic vehicle navigates to the pick face. In step 516, the order selector picks the products from the pick face. If the route is complete, step 518, the picked load is delivered, in step 520. The load could be delivered to a shipping and receiving area, a zone in the warehouse, or some other designated location. If the route was not complete in step 518, the method returns to step 512, where the user initiates robotic travel to the next pick face.

Figure 6:
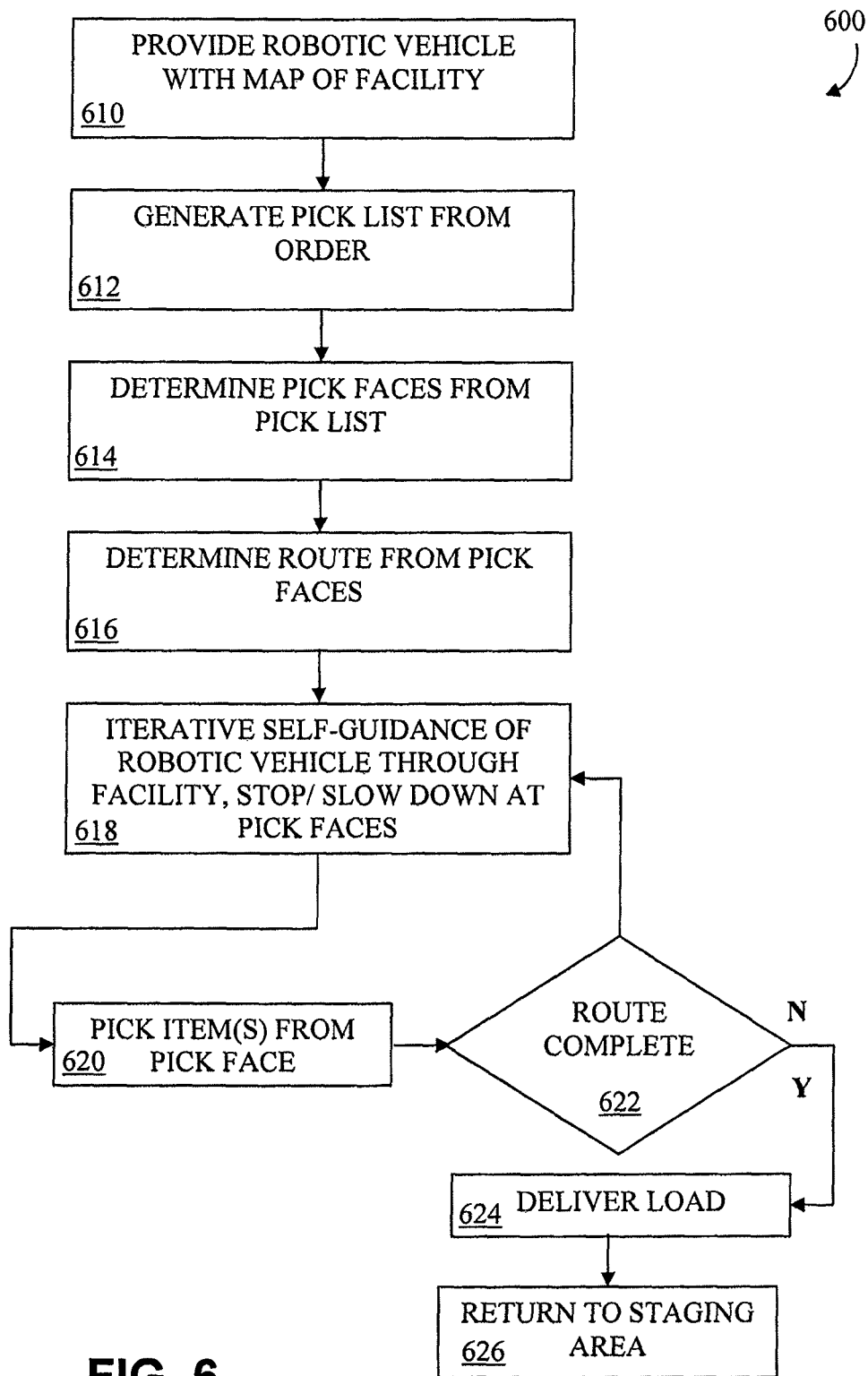
FIG. 6 is a flowchart depicting an embodiment of a method of picking cases, in accordance with aspects of the present invention.

FIG. 6 is a flowchart depicting an embodiment of a method 600 of picking cases, in accordance with aspects of the present invention. This method can be carried out by the robotic vehicle modules 300 of FIG. 3, or similar systems. Method 600 can take at least the following two forms:

Auto-Location Case Picking—A pre-programmed map of the warehouse sets up each location as a distance grid and can be set as a pause or slow down location for the robotic vehicle. For each order, stops or slow downs are "Selected" based on the location of the product on that order. The robotic vehicle travels through the warehouse in a pre-determined path, stopping or slowing where the order needs product. The order selector walks along with the robotic vehicle and the voice system tells him when to pick and what to pick. The voice command will tell the robotic vehicle to go to the next location.

WMS-Directed Location Case Picking—An order will be sent to a robotic vehicle from the WMS 140'. Based on the locations in that order, the robotic vehicle will travel a "Smart Path" that is created based on the order stops or slow downs. The robotic vehicle will travel to each location and stop or slow down for work. This creates the flexibility to have the order selectors follow the robotic vehicle or wait in pre-assigned zones for the robotic vehicles to arrive for work, or be dynamically dispatched to successive pick faces by a centralized system, e.g., WMS 140'.

As shown in FIG. 6, a robotic vehicle can be provided with a map representing the warehouse, in step 610. In step 612, a pick list is generated from an order. The pick list can be manually generated, computer generated, or some combination thereof. Pick faces are determined in step 614, and a route can be determined from the pick faces, in step 616. Step 618 begins iterative guidance through the warehouse. In step 618, navigation can be initiated by the user with a command input to the robotic vehicle. The robotic vehicle navigates to the next pick face based on the route and map.

In step 620, product is picked from the pick face, and loaded on the robotic vehicle, e.g., a pallet transport or tugger with cart. If, in step 622, the route is complete, the load can be delivered, as described above. But if the route is not complete, the process returns to step 618 for robotic navigation to the next pick face. After the load is delivered the robotic vehicle can navigate to a staging area, in step 626.

Figure 7:
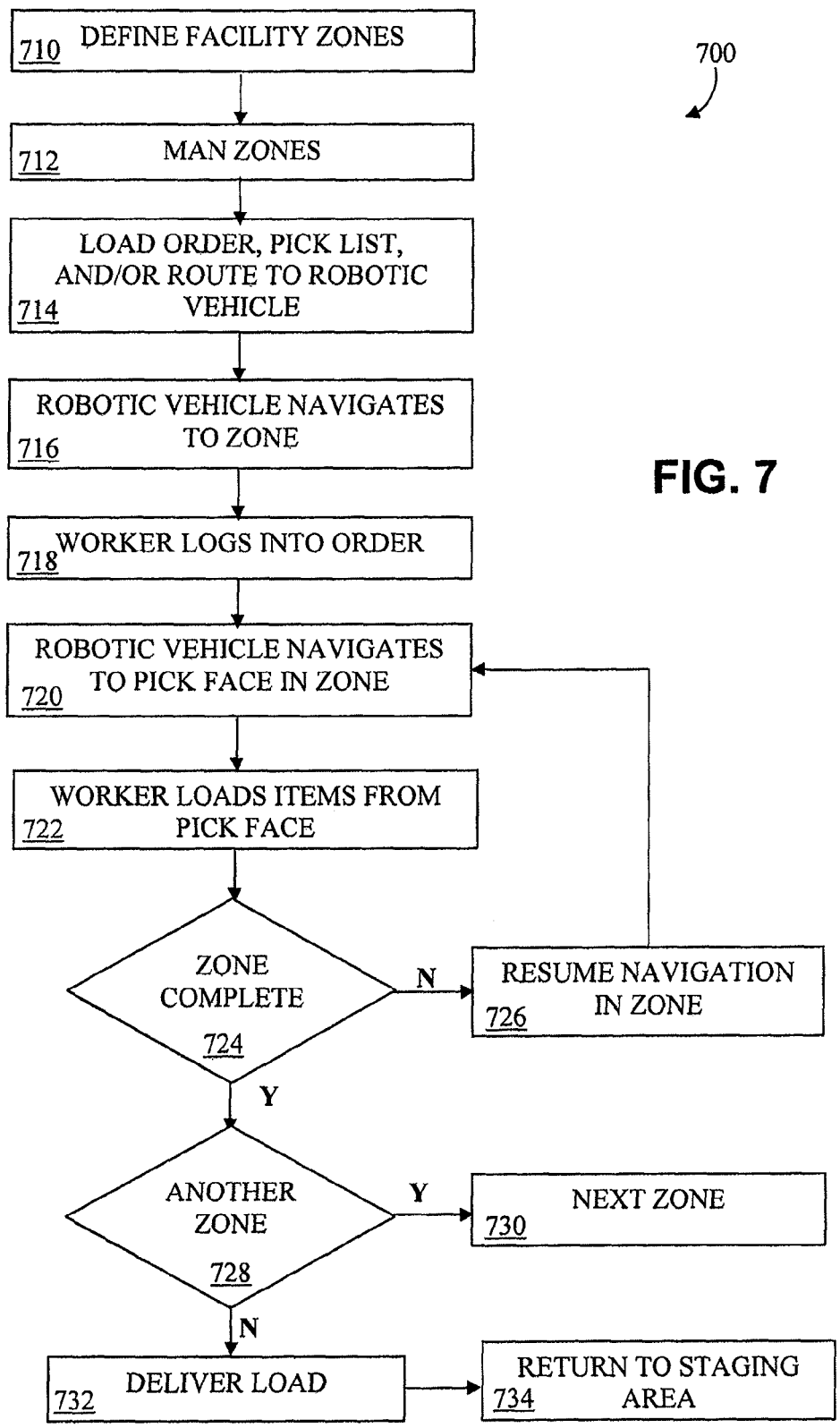
FIG. 7 is a flowchart depicting an embodiment of a method of picking cases using zones and robotic vehicle assistance, in accordance with aspects of the present invention.

FIG. 7 is a flowchart depicting an embodiment of a method 700 of picking cases using zones and robotic vehicle assistance, in accordance with aspects of the present invention. This method can be carried out by the robotic vehicle modules 300 of FIG. 3, or similar systems. Method 700 can take at least the following form:

Zone Case Picking—The order selectors are assigned to strategic zones ("pick zones") that are dynamic enough to be changed in order to balance productivity/capacity of the order selectors and the capacity/utilization of the robotic vehicles. Cases/Hour rates can be set per zone to minimize the amount of travel for different zones/order selectors based on density for a certain area. The robotic vehicle will allow an Ops Manager to set the zones for the day/time-period and the robotic vehicles based on the volume for the day. The WMS 140' can assign orders to the robotic vehicles (or an operator can scan in an order when pallets are loaded on the robotic vehicle) and the order locations will be used to direct the robotic vehicle where it needs to go. In some embodiments, robotic vehicle modules 300 will optimize the path decision for the robotic vehicle to get from location to location, as described herein. The order selector can interact with each robotic vehicle that arrives in a zone by logging into the "Robot Order" or an auto-logon based on the zone the robotic vehicle is in, so that the order selector can be directed via a voice or other signal to pick a number of cases from the pick faces in that zone. The robotic vehicle can be directed via a voice signal or other signal to move onto the next zone. For example, such signals could include a physical human gesture, a hands-on or remote order selector input, or some other signal.

As shown in FIG. 7, zones are defined within the warehouse 100, in step 710, and the zones are staffed with order selectors in step 712. In step 714, an order, pick list and/or route are loaded into the robotic vehicle. In step 716, the robotic vehicle navigates to a zone. An order selector logs into an order, in step 718, either directly at the robotic vehicle or through an electronic device that communicates with the robotic vehicle either directly or through the WMS 140. In step 720, the robotic vehicle navigates to the first pick face in the zone. The order selector loads the items in step 722. If picking within the zone is not complete, in step 726, the robotic vehicle navigates to the next pick face within the same zone.

If, in step 724, picking in the zone is complete, a determination is made of whether or not there is a next zone, in step 728. If so, the robotic vehicle goes to a next zone in step 730. If not, the robotic vehicle delivers the load, in step 732. After the load is delivered, the robotic vehicle could go to a staging area, as in step 734. For example, the robotic vehicle could go to a shipping and receiving area, as an example, if the order is complete.

In various embodiments described herein, the robotic vehicle has one or more of the order, pick list and route locally stored. But in other embodiments, one or more of the foregoing could be externally stored, e.g., at the WMS, and communicated to the robotic vehicle as needed—perhaps just in time. For example, when an order selector loads product from a pick face and is ready to initiate robot self-navigation to a next location, a voice or other input could cause the robotic vehicle to receive the next pick face location from the WMS or other external system.

In accordance with aspects of the present invention, a variety of case picking solutions are possible by including a robot control system in facility equipment, such as pallet transports, forklift, highlifts, and tuggers, to form a robotic vehicle. The resulting flexibility can be enhanced by interfacing the robotic vehicle with a storage facility management system to maximize the utilization of robotic vehicles to support a combination of factors that are important, in varying degrees, to each customer/facility. Balancing cases/hour with the labor costs and orders/hour may have different implications for efficiency and impact other areas, like put-away and shipping. There is great value in letting each facility balance its own people, processes and robots to achieve its own goals.

At the same time, the robot control system is flexible enough to integrate with other technology in use at the warehouse. The robots take direction from the WMS order, e.g., as orders are printed for the pickers, can follow an optimal path, and can display what to pick for the worker on a screen mounted on the robot. The robots can arrive at a zone and the worker can read the screen for what to pick. Additionally or alternatively, the voice system can tell the worker what to pick. No matter the infrastructure and goals for that day and for that warehouse, the robot control system can be tuned on the fly to support the needs in real-time. For instance, a warehouse can use label picking in perishables, voice in dry goods, and/or RF display in bulk, as examples. The robots can travel from location to location and the workers can be prompted via the method they are using.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A robotic vehicle, comprising:
a load platform configured to hold products;
a processor configured to:
generate a pick list from an order comprising a plurality of different products; and
generate navigation instructions from the pick list and an electronic map of a storage facility comprising a plurality of product pick faces, wherein each pick face is a location designated for storage of a product, the navigation instructions including a plurality of locations of a plurality of pick faces corresponding to the plurality of different products of the order; and
a vehicle control system configured to self-navigate the robotic vehicle through the storage facility in response to the navigation instructions, including:
stopping or slowing at each of the plurality of different pick faces represented in the navigation instructions to enable loading of the plurality of different products from the order onto the load platform.

2. The vehicle of claim 1, wherein the electronic map includes a two-dimensional representation of the plurality of product pick faces.

3. The vehicle of claim 1, wherein the robotic vehicle is a robotic fork lift.

4. The vehicle of claim 1, wherein the robotic vehicle is a robotic tugger.

5. The vehicle of claim 1, further comprising:
a communication interface configured to wirelessly communicate with one or more external system.

6. The vehicle of claim 5, wherein the communication interface is configured to wirelessly communicate via the Internet.

7. The vehicle of claim 5, wherein the communication interface is configured to wirelessly communicate with a storage facility management system.

8. The vehicle of claim 7, wherein the electronic representation of a set of products to be picked is a pick list electronically communicated to the robotic vehicle by the storage facility management system.

9. The vehicle of claim 7, wherein the electronic representation of a set of products to be picked is an order electronically communicated to the robotic vehicle by the storage facility management system.

10. The vehicle of claim 9, wherein the case picking module is further configured to generate a pick list from the order and generate the navigation instructions from the pick list and the electronic map.

11. The vehicle of claim 5, wherein the communication interface is configured to wirelessly communicate with a handheld user device.

12. The vehicle of claim 11, wherein the electronic representation of a set of products to be picked is a pick list electronically communicated to the robotic vehicle by the handheld user device.

13. The vehicle of claim 11, wherein the electronic representation of a set of products to be picked is an order electronically communicated to the robotic vehicle by the handheld user device.

14. The vehicle of claim 13, wherein the case picking module is further configured to generate a pick list from the order and generate the navigation instructions from the pick list and the electronic map.

15. The vehicle of claim 1, wherein the vehicle control system is configured to pause the robotic vehicle at each pick face and then resume self-navigation in response to a user input.

16. A robotic vehicle system, comprising:
a load platform configured to hold products;
a processor configured to:
generate a pick list from an order comprising a plurality of different products; and generate navigation instructions from the pick list and an electronic map of a storage facility comprising a plurality of product pick faces, wherein each pick face is a location designated for storage of a product, the navigation instructions including a plurality of locations of a plurality of pick faces corresponding to the plurality of different products of the order;

a vehicle control system configured to self-navigate the robotic vehicle through the storage facility in response to the navigation instructions, including:

pausing or slowing at each of the plurality of different pick faces represented in the navigation instructions to enable loading of the plurality of different products from the order onto the load platform; and a user device configured to communicate with the vehicle control system to cause the robotic vehicle to resume the self-navigation after pausing or slowing in response to an input from the user input device.

17. The vehicle of claim 16, wherein the user device is a handheld user device configured to wirelessly communicate with the robotic vehicle.

18. The vehicle of claim 16, further comprising a communication interface configured to wirelessly communicate with a storage facility management system to receive at least one of the electronic map or the electronic representation of a set of products to be picked.

19. The vehicle of claim 16, wherein the electronic representation of a set of products to be picked is a pick list.

20. The vehicle of claim 16, wherein the electronic representation of a set of products to be picked is an order and the case picking module is configured to generate a pick list from the order.

* * * * *